June 24, 1930.  M. F. CARR  1,767,511
LUBRICATING SYSTEM
Filed Aug. 25, 1925
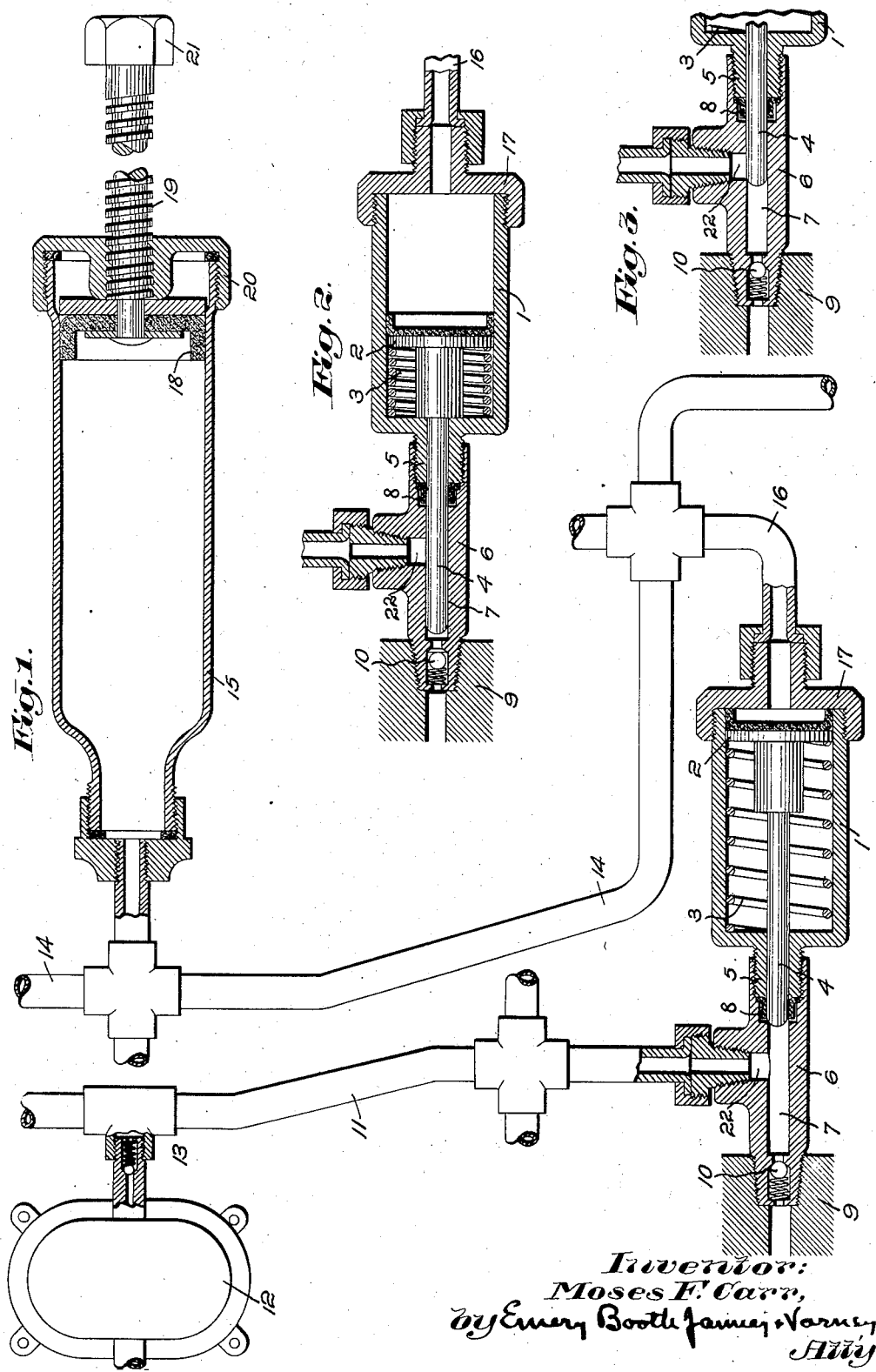
Inventor:
Moses F. Carr,
by Emery Booth Janney & Varney
Attys.

Patented June 24, 1930

1,767,511

UNITED STATES PATENT OFFICE

MOSES F. CARR, OF LEXINGTON, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING SYSTEM

Application filed August 25, 1925. Serial No. 52,326.

This invention aims to provide improvements in pressure lubricating systems.

In the drawings which illustrate a preferred embodiment of the invention:

Figure 1 is a general layout of a portion of the preferred form of lubricating system, being partly in section and partly in elevation;

Fig. 2 is a section through one of the charge determining pressure multiplying cups showing the position of the parts when lubricant is being expelled therefrom; and Fig. 3 is a section of a portion of a cup showing the relation of the parts immediately subsequent to cutting off the supply of lubricant to the charge determining chamber.

Referring to the drawings I have shown a lubricating system of the so-called central lubricating type which is particularly, though not exclusively, useful for lubricating the various bearings of a motor vehicle. The system illustrated is a two-pipe system and includes a plurality of charge determining pressure multiplying cups (only one of which is shown), lubricant supply means for supplying lubricant to the cups and pressure supply means for operation of means in the cups to force a predetermined quantity of lubricant from each cup to a bearing.

Each charge determining cup includes a cylinder portion 1, a piston 2 normally urged toward the inlet end of the cylinder by a spring 3 and a plunger 4 connected to the piston and guided in a reduced end portion 5 of the cylinder 1 as illustrated. A part 6 is threadedly secured to the reduced end 5 of the cylinder and presents a charge determining chamber 7 of substantially smaller cross-sectional area than the cross-sectional area of the piston. The end of the plunger 4 is normally withdrawn to that end of the chamber 7 nearest the cylinder 1 and is surrounded by a flexible hat washer 8 held between the part 6 and the end of the reduced portion 5 thereby to prevent lubricant from leaking from the chamber 7 into the cylinder 1. The other end of the part 5 may be secured to a bearing 9 to be lubricated as shown in Fig. 1. A spring-pressed check valve 10 is provided at the outlet end of the chamber 7 to prevent passage of lubricant from the chamber except when forced therefrom by the plunger 4.

Lubricant may be supplied to any number of chambers, similar to the chamber 7, through a series of pipes or conduits 11 connected to the pump 12 of the automobile which may supply the lubricant from the crankcase (not shown) or from any other convenient source. The conduit may be secured to the part 6 for communication with the chamber 7 as shown in Fig. 1. A spring pressed ball check 13 is located in the passage of the conduit connected to the pump thereby to permit flow of lubricant from the pump while preventing return of the lubricant thereto as more fully hereinafter described.

The means for operating the pistons 2 in the cups comprises a system of piping which includes a main pipe or conduit 14 connected to a pressure supply barrel 15 (Fig. 1) and a plurality of short pipes 16 leading from the main conduit 14 to the removable heads 17 secured to the cylinders 1 thereby connecting the cylinders with a source of pressure for operating the pistons in the cups. The pressure supply barrel may be filled with lubricant or any other suitable means which may be placed under pressure by a piston 18 carried by a screw-threaded stem 19 threaded into the head 20 of the barrel 15.

In operation, the pump 12, which may be the well-known gear type, forces lubricant at a relatively low rate of pressure through the conduits 11 to the chamber 7 of each cup in the lubricating system. The pressure of the lubricant supplied by the pump is not sufficient to open the check valve 10 and therefore the chamber 7 becomes completely filled with lubricant. During this operation the piston 2 and plunger 4 are held in their normal positions as indicated in Fig. 1. When it is desirable to lubricate the bearings of the motor vehicle, or other apparatus to which the system is attached, the operator merely fits a wrench over the nut 21 provided at the outer end of the stem 19 and turns the stem in a clockwise direction thereby moving the piston 18 toward the discharge end of the barrel 15. The piston 18 thereby compresses the lubricant or other suitable means and builds up a pressure, in the pressure supply system, great enough to move the pistons 2 to compress the springs 3 and operate the lubricant discharging plungers 4 in all the cups.

In each cup the plunger 4 moves forward in the chamber 7 until the inlet passage 22 is covered by the plunger as illustrated in Fig. 3. Thereafter as the plunger is forced forward a predetermined quantity of lubricant may be forced from the chamber past the valve 10 to the bearing 9 under a relatively high potential pressure. The ratio between the cross-sectional area of the plunger 4 and the cross-sectional area of the piston 2 is great enough to force lubricant into a tight bearing at a potential pressure which is great enough to remove or loosen the hardened lubricant or dirt and permit the bearing to receive a charge of fresh lubricant from the cup.

The charge of lubricant may vary for different bearings and may be provided by varying the dimensions of the chamber 7 to obtain the desired result.

The capacity of the barrel 15 should be greater than the combined volumes of lubricant or other suitable means required to operate all of the cups in the system thereby to assure positive operation of each cup.

When the pressure in the pressure supply system has been released by turning back the piston 18 in the barrel 15, the spring 3 in each cup will return the piston 2 and plunger 4 to their normal positions as shown in Fig. 1. During the return stroke of the plunger the check valve 10 closes to prevent the discharged lubricant from being drawn back into the chamber 7 by suction created by the plunger.

From the above description it will be understood that the system is simple in construction, positive in operation and easily and quickly operable to lubricate all the bearings by operation from a given point.

While I have shown and described a preferred embodiment of my invention it will be understood that changes involving omission, alteration, substitution and reversal of parts and even changes in the mode of operation may be made without departing from the scope of my invention which is best defined in the appended claims.

Claims:

1. A lubricating system comprising, in combination, a lubricant cup having a charge determining chamber, a conduit communicating directly with said chamber, a pump for filling said chamber with lubricant through said conduit and continuously maintaining lubricant under low pressure in said chambers, valve means for trapping the lubricant in said chamber, pressure operated imperforate plunger means located in said cup for forcing the lubricant from said chamber under a relatively high potential pressure, a second pump, and a second conduit connecting said pump and cup for supplying a fluid under pressure to actuate said plunger.

2. A lubricating system comprising, in combination, a charge determining device including a chamber of relatively small cross-sectional area and a combined plunger and piston operable to force a predetermined quantity of lubricant from said chamber, a pump for supplying lubricant to said chamber and operating continuously to maintain the lubricant therein under low pressure, conduit means for conveying the lubricant from said pump to said chamber, manually operable pressure supply means independent of said pump for exerting a pressure on said piston thereby to move said plunger into said chamber to expel the lubricant therefrom, and separate conduit means connecting said pressure supply means with said piston.

3. A lubricating system comprising, in combination, a charge determining device including a chamber of relatively small cross-sectional area and a combined imperforate plunger and cup leather piston operable to force a predetermined quantity of lubricant from said chamber, a pump for supplying lubricant to said chamber and maintaining the lubricant therein at a predetermined low pressure, conduit means for conveying the lubricant from said pump to said chamber, a barrel containing a supply of lubricant, separate conduit means connecting said barrel with said cup at the inlet end thereof, and manually operable means for compressing the lubricant in said barrel so that the pressure of the lubricant may operate said plunger through pressure exerted upon said piston thereby to force a predetermined quantity of lubricant from said chamber.

4. A lubricating system comprising, in combination, a charge determining device located adjacent to a bearing, a cylinder part, a piston reciprocable in said cylinder part, a chamber between the cylinder and the bearing having a relatively smaller cross-sectional area than the area of said piston, an imperforate plunger operable in said chamber for forcing lubricant therefrom to the bearing, a lubricant supply and conduit system communicating with said chamber for supplying lubricant thereto and maintaining a predetermined pressure upon the lubricant therein, and an independent manually operable pressure supply and conduit system connected directly to said cylinder for supplying the pressure to operate said plunger through operation of said piston.

5. A lubricating system comprising, in combination, a charge determining device located adjacent to a bearing, a cylinder part, a piston reciprocable in said cylinder part, a chamber between the cylinder and the bearing having a relatively smaller cross-sectional area than the area of said piston, an imperforate plunger operable in said chamber for forcing lubricant therefrom to the bearing, a lubricant supply and conduit system communicating with said chamber for supplying lubricant thereto and maintaining it therein at a predetermined pressure, a check valve at the discharge end of said chamber preventing flow of lubricant from said chamber except when forced therefrom by said plunger, and an independent manually operable pressure supply and conduit system connected directly to said cylinder for supplying the pressure to operate said plunger through operation of said piston.

6. A lubricating system comprising, in combination, a charge determining device located adjacent to a bearing, a cylinder part, a piston reciprocable in said cylinder part, a chamber between the cylinder and the bearing having a relatively smaller cross-sectional area than the area of said piston, an imperforate plunger operable in said chamber for forcing lubricant therefrom to the bearing, a lubricant supply system communicating with said chamber for supplying lubricant thereto and maintaining a predetermined low pressure on the lubricant therein, said supply system including a pump, a conduit connecting said pump with said chamber and a check valve located adjacent to said pump for preventing return of lubricant thereto, a check valve at the discharge end of said chamber preventing flow of lubricant from said chamber except when forced therefrom by said plunger, and an independent manually operable pressure supply and conduit system connected directly to said cylinder for supplying the pressure to operate said plunger through operation of said piston.

7. A lubricating system comprising, in combination, a charge determining device located adjacent to a bearing, a cylinder part, a piston reciprocable in said cylinder part, a chamber between the cylinder and the bearing having a relatively smaller cross-sectional area than the area of said piston, an imperforate plunger operable in said chamber for forcing lubricant therefrom to the bearing, a continuous low pressure lubricant supply system communicating with said chamber for supplying lubricant thereto, said supply system including a pump, a conduit connecting said pump with said chamber and a check valve located adjacent to said pump for preventing return of lubricant thereto, a check valve at the discharge end of said chamber preventing flow of lubricant from said chamber except when forced therefrom by said plunger, and an independent manually operable pressure supply and conduit system connected directly to said cylinder for supplying the pressure to operate said plunger through operation of said piston, said pressure supply system including a supply barrel filled with lubricant, means for placing the lubricant in said barrel under pressure and a conduit connecting said barrel with said cylinder.

In testimony whereof, I have signed my name to this specification.

MOSES F. CARR.